Patented Apr. 9, 1940

2,196,950

UNITED STATES PATENT OFFICE 2,196,950

PHOTOGRAPHIC PRINTING PROCESS

Rudolf Zahn, Wiesbaden, Oskar Süs, Wiesbaden-Biebrich, and Robert Franke, Wiesbaden, Germany, assignors to Kalle & Co. Aktiengesellschaft, Wiesbaden-Biebrich, Germany No Drawing. Application March 4, 1938, Serial No. 193,914. In Germany March 8, 1937

7 Claims. (Cl. 95—6)

This invention relates to diazotype processes and more particularly to the use of certain azo-components in this art. With the aid of the new azo-components forming an object of this invention, very useful light sensitive materials and prints of very good quality can be obtained. Other objects of the invention are light sensitive layers containing the said new azo-components.

The applicants have found that 2.3-dioxynaphthalene is eminently suitable as an azo-component for diazotype purposes. The diazotypes prepared with the new azo-component and the proven amino-diazo-compounds are distinguished in general by very dark to black color tones and strong contrasts, even when pencil drawings are used as originals. This favorable behavior of 2.3-dioxynaphthalene still takes place when relatively thin preparations are used so that light sensitive layers which only need a short exposure to light can be prepared without the good legibility of the prints being in any way prejudiced.

2.3-dioxynaphthalene is, moreover, sufficiently soluble in water to be usable without substitution by sulpho-groups. The water fastness of the prints obtained with this azo-component is, therefore, very good as long as diazo compounds having sulpho-groups or similar groups which increase the solubility in water are not used. Moreover, the fastness of the prints to light is good so that they are very stable.

Instead of 2.3-dioxynaphthalene itself, derivatives or substitution products of this compound can be used, even if these in general are not quite equivalent in their properties to 2.3-dioxynaphthalene. The term "a 2.3-dioxynaphthalene", when used in this specification, is therefore to be understood to comprise the 2.3-dioxynaphthalene itself and its derivatives and substitution products. Obviously only such derivatives and subtitution products come into consideration which are yet capable of coupling with diazo compounds i. e. have at least one of the two hydroxyl groups unchanged and a free unsubstituted place in the naphthalene nucleus in the ortho-position to the said hydroxyl group. Thus, in particular, one oxy-group can be etherified without greatly changing the essential properties of 2.3-dioxynaphthalene as an azo-component. Substituents can also be introduced into the naphthalene nucleus, whereby certain variations in the tone of the prints are obtained. It is advisable, however, to ensure that the solubility is not unfavorably influenced by the alteration in the molecule of 2.3-dioxynaphthalene. If possible, the good solubility of the azo-component in water or in acidified water, respectively, should be retained in order that it can be applied in the customary fashion by spreading on paper in aqueous solution in a sufficient quantity. On the other hand, the water fastness of the dyestuffs obtained must be impaired to the least possible extent. Thus, on etherification of the 2.3-dioxynaphthalene, there are used particular those of the type of the monoxy-ethyl ether, the monoglycollic acid ether or the mono-N-dimethylamino($\beta$)-ethyl ether, in which a sufficient solubility is present due to the oxy groups, the carboxyl groups or amino groups present in the alkylether residue. As a substituent in the nucleus, the carboxyl group comes, for example, under consideration. For instance 2.3-dioxynaphthalene-6-carboxylic acid represents a suitable compound. Less suitable as substituents are, for example, sulpho groups as, on the introduction of these substituents, the water fastness of the prints obtained is not as good as when using the simple 2.3-dioxynaphthalene.

2.3-dioxynaphthalene and its derivatives can be incorporated in the diazo layers during their preparation in the usual manner. Such light-sensitive layers, which are developed with ammonia, can also contain the additions usual in diazo layers such as metallic salts, moistening means, dyestuffs, acids, anti-yellowing means and the like.

The particular suitability of 2.3-dioxynaphthalene as azo component for diazotype purposes was very surprising especially inasmuch as other dioxynaphthalenes are little suited for this purpose since, in general they give prints which are poor as regards their fastness to light and exhibiting unsatisfactory color tones. Even the already proposed 2.7-dioxynaphthalene with regard to the possibility of obtaining dark dyes with the simple diazo compounds in question, is essentially inferior to 2.3-dioxynaphthalene. Also the light-fastness of the dyestuff obtained by the use of 2.3-dioxynaphthalene is better than that obtained by the use of 2.7-dioxynaphthalene.

The following examples illustrate the invention:

(1) Paper or some other support or carrier is sensitized in the customary fashion with a solution of 5 grams citric acid or tartaric acid, 4 grams thiourea, 4 grams naphthalenetrisulphonic acid sodium salt, .4 gram 2.3-dioxynaphthalene and 2 grams of the zinc chloride double salt of the diazo compound of 4-amino-1-diethyl aminobenzene in 100 ccm. of water. After exposing under an original, water-fast prints with fine black to blue black lines, on a white background, are obtained. With a solution of similar composition, suitably diluted, films can also be sensitized by spreading or soaking.

(2) The procedure is the same as in Example 1 but, as a light-sensitive compound, the zinc chloride double salt of the diazo compound of 1-mono-ethyl amino-2-methyl-4-amino benzene is employed.

By the use of amino diazo compounds in which the amino group contains other alkyl groups as substituents, the tones of the prints can be somewhat varied.

(3) A solution, prepared while warm, of 4 grams citric acid, 4 grams naphthalenetrisulphonic acid sodium salt, 5 grams thiourea, 2 grams aluminium sulphate, 2 grams of the zinc chloride double salt of the diazo compound of 1-diethyl amino-4-amino benzene, .4 gram 2.3-dioxy-naphthalene-6-carboxylic acid in 100 ccm. water is spread on paper. With this paper prints with blue-black tones may be obtained. Instead of the diazo compound mentioned, 1.2 grams of the diazo compound of p-amino-diphenyl-amine can be employed with good results.

(4) 4 grams tartaric acid, 5 grams thiourea, 1.8 grams of the diazo compound of 1-diethyl-amino-3-ethoxy-4-aminobenzene, .6 gram 2.3-dioxynaphthalene-monoxyethylether having the following formula:

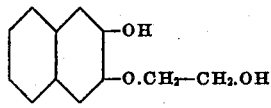

are dissolved in 100 ccm. of warm water and the solution is spread on a carrier. On copying on this material, prints with very dark tones are obtained.

(5) A paper exposed beneath an original which is sensitized with a solution of 1 gram citric acid, 1 gram boric acid, 3 grams naphthalenetrisulphonic acid sodium salt, .5 gram aluminium sulphate, 2.5 grams of the zinc chloride double salt of the diazo compound of 4-amino-1-benzoylamino-2.5-diethoxybenzene in 100 ccm. of water, is developed by coating with a thin layer of a solution of 10 grams sodium acetate, 5 grams sodium chloride and .6 gram 2.3-dioxynaphthalene in 100 ccm. of water.

(6) 4 grams citric acid, 5 grams thiourea, 2 grams aluminium sulphate, 5 ccm. glycerine, 2 grams of the zinc chloride double salt of the diazo compound of 4-amino-1-diethylaminobenzene and .6 gram mono-N-dimethylamino(β)-ethyl ether of 2.3-dioxynaphthalene

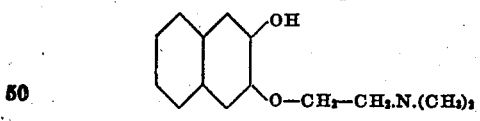

are dissolved in 100 ccm. of water and spread on a paper. Prints with blue-black tones can be prepared in this way.

(7) The procedure is the same as in Example 6, except that, instead of the azo component mentioned there, .6 gram of the monoglycollic acid ether of 2.3-dioxynaphthalene

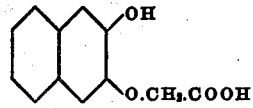

is employed.

(8) The procedure is the same as in Example 1 or 2, but, instead of 2.3-dioxynaphthalene, .5 gram 1-methyl-2.3-dioxynaphthalene or another alkylated 2.3-dioxynaphthalene is used.

We claim:

1. A light-sensitive layer comprising besides an amino diazo compound a 2.3-dioxynaphthalene as coupling component.

2. A light-sensitive layer according to claim 1, wherein the said amino diazo compound is a para-amino diazo compound.

3. A light-sensitive layer comprising besides an amino diazo compound a 2.3-dioxynaphthalene as coupling component, which compound is free from sulfo groups.

4. A light-sensitive layer comprising besides an amino diazo compound a substance of the following general formula:

wherein R stands for a member of the group consisting of hydrogen, methyl and ethyl, the two last mentioned radicals being substituted by a member of the group consisting of hydroxyl, carboxylic, amino and substituted amino groups.

5. A light-sensitive layer which comprises besides an amino diazo compound the 2.3-dioxynaphthalene.

6. A light-sensitive layer which comprises besides an amino diazo compound the 2.3-dioxynaphthalene mono-oxyethylether.

7. A light-sensitive layer which comprises besides an amino diazo compound the 2.3-dioxynaphthalene monoglycollic acid ether.

RUDOLF ZAHN.
OSKAR SÜS.
ROBERT FRANKE.